United States Patent
Bishop

(10) Patent No.: US 8,175,227 B2
(45) Date of Patent: May 8, 2012

(54) METHODS, SYSTEMS, AND COMPUTER PROGRAM PRODUCTS FOR PROVIDING MESSAGE MANAGEMENT SERVICES

(75) Inventor: Michael Bishop, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1203 days.

(21) Appl. No.: 11/427,976

(22) Filed: Jun. 30, 2006

(65) Prior Publication Data

US 2008/0037731 A1 Feb. 14, 2008

(51) Int. Cl.
*H04M 1/64* (2006.01)
(52) U.S. Cl. .................. 379/88.12; 379/88.23
(58) Field of Classification Search ............ 379/88.12, 379/207.03, 88.23; 340/309.7
See application file for complete search history.

(56) References Cited

U.S. PATENT DOCUMENTS

| | | | |
|---|---|---|---|
| 7,233,229 B2* | 6/2007 | Stroupe et al. | 340/309.7 |
| 7,260,189 B2* | 8/2007 | Silver et al. | 379/88.23 |
| 7,496,631 B2* | 2/2009 | Austin-Lane et al. | 709/206 |
| 7,561,677 B2* | 7/2009 | Flynt et al. | 379/88.14 |
| 2007/0180032 A1* | 8/2007 | Pearson | 709/206 |
| 2007/0263793 A1* | 11/2007 | Khouri et al. | 379/67.1 |
| 2008/0005250 A1* | 1/2008 | Oksum | 709/206 |
| 2008/0301252 A1* | 12/2008 | Lipton et al. | 709/207 |
| 2009/0055220 A1* | 2/2009 | Rapaport et al. | 705/2 |
| 2010/0195807 A1* | 8/2010 | Sigmund et al. | 379/88.13 |

* cited by examiner

*Primary Examiner* — Davetta W Goins
*Assistant Examiner* — Mohammad Islam
(74) *Attorney, Agent, or Firm* — Cantor Colburn LLP

(57) ABSTRACT

A method, system, and computer program product for creating a reminder to take action on a message is provided. The method includes presenting a message that includes communication detail components and content. The method also includes receiving a request to create a reminder to take action on the message and creating a reminder that includes at least the communication detail components. The method further includes sending the reminder to a location. The location and information is related to an action to be taken and is specified by a recipient of the message.

24 Claims, 6 Drawing Sheets

METHODS, SYSTEMS, AND COMPUTER PROGRAM PRODUCTS FOR PROVIDING MESSAGE MANAGEMENT SERVICES

BACKGROUND OF THE INVENTION

The present invention relates generally to managing message communications, and more particularly, to methods, systems, and computer program products for providing a reminder to take action on messages.

Messaging systems, such as voicemail, provide message communications services to people all around the world. Messaging subscribers can access messages stored in their inboxes from any location and at any time of the day. With the advent of packet-switching technology, message communications options have expanded and developed into new applications, such as email and instant messaging. Today, it is not uncommon for an individual to maintain more than one messaging account (e.g., email account, voicemail account, etc.). In addition, employers often provide messaging services to their employees so that an individual/employee may have multiple messaging accounts, each serving a different purpose (e.g., work-related email account, home/personal email account). Maintaining multiple messaging system accounts can be cumbersome and confusing for the individual, particularly when trying to reconcile items requiring action on the part of the individual. For example, when accessing a voicemail account and detecting a new message in the voicemail inbox, the individual may need to track the message so that future action can be taken (e.g., returning the call, scheduling a meeting, etc.). However, oftentimes it is not feasible for the individual to take the appropriate action at the time the voicemail message is presented to the individual. This may result in the individual forgetting to take the required action. Although this problem is particularly prevalent and noticeable in current voicemail messaging systems, it may also be a problem in other types of messaging systems.

What is needed, therefore, is a way to provide reminders to users of a messaging system, such as a voicemail system, to take future action on a message.

BRIEF SUMMARY OF THE INVENTION

Exemplary embodiments include a method for creating a reminder to take action on a message. The method includes presenting a message that includes communication detail components and content. The method also includes receiving a request to create a reminder to take action on the message and creating a reminder that includes at least the communication detail components. The method further includes sending the reminder to a location. The location and information is related to an action to be taken and is specified by a recipient of the message.

Additional exemplary embodiments include a system and computer program product for providing a reminder to take action on voicemail system messages.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In accordance with exemplary embodiments, methods, systems, and computer program products for implementing reminders for users of a voicemail system to take action on a voicemail message are provided. The reminders are implemented via message management services as described herein.

Figure 1:
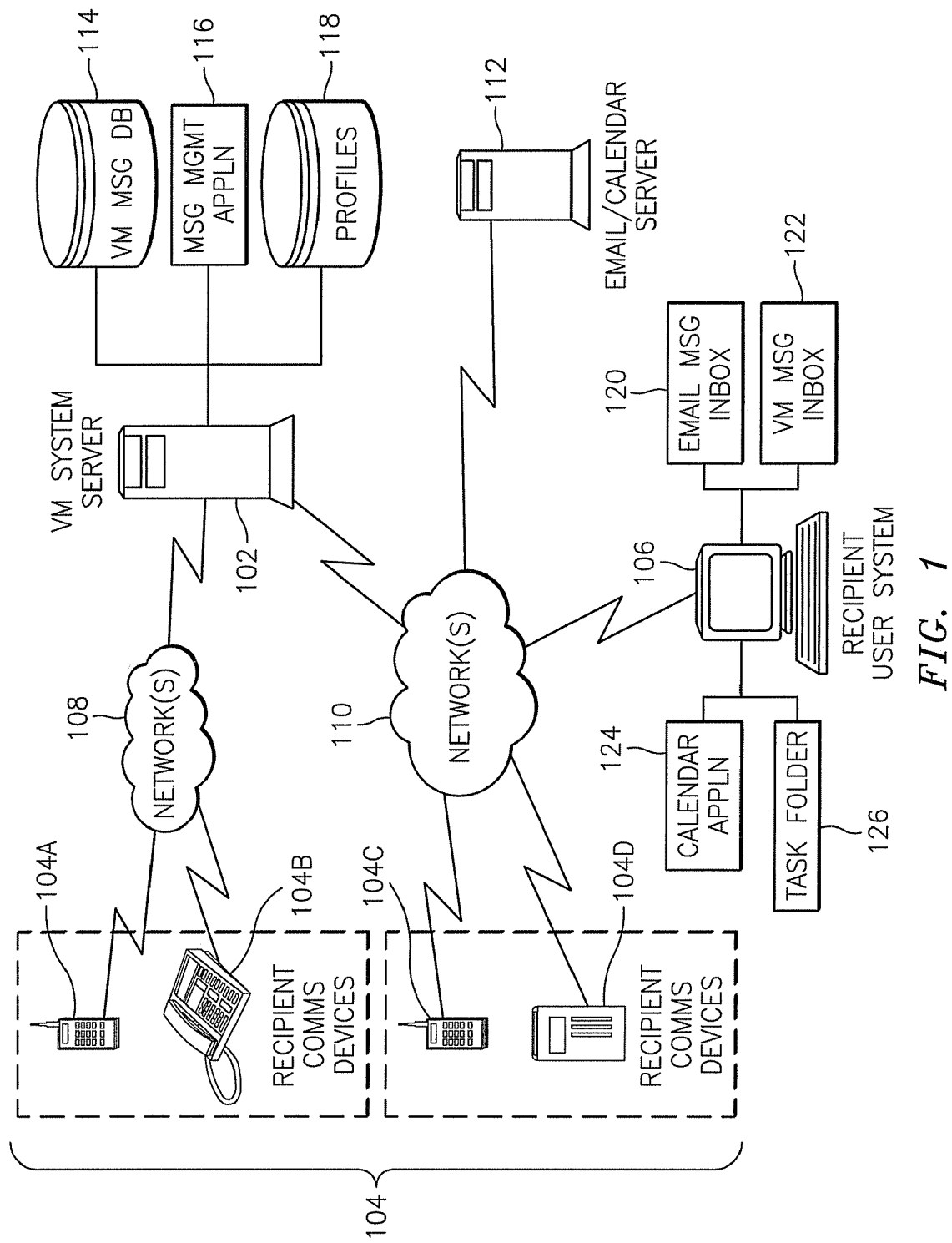
FIG. 1 is a block diagram depicting a system upon which the message management services may be implemented in exemplary embodiments.

Turning now to FIG. 1, an exemplary system upon which the message management services may be implemented will now be described. The system of FIG. 1 includes a voicemail system server 102 in communication with recipient communications devices 104, a recipient user system 106, and an email/calendar server 112 over one or more networks 108 and 110. While a voicemail server and an email/calendar server are shown for ease of illustration, it should be appreciated that the invention is applicable to any kind of messaging system, not limited to voicemail and email/calendar messaging systems.

Voicemail system server 102 provides voicemail services to users of communications devices (e.g., recipient communications devices 104), typically for a fee. Voicemail system server 102 may include a high-speed processing device for handling the receipt and storage of voicemail messages on behalf of its user population (e.g., subscribers of the voicemail system services). In exemplary embodiments, voicemail messages received by voicemail system server 102 are stored in a data repository 114 via, e.g., accounts established for its user population. This voicemail message database of data repository 114 stores voicemail inboxes for each user of the voicemail system services.

Voicemail system server 102 executes one or more applications for implementing these voicemail services. For example, voicemail system server 102 may execute an application for managing the user accounts and services, such as creating, editing and deleting voice mailboxes, establish rules for storage capacities and length of time each message may be stored, as well as subscription terms and conditions. The voicemail system services include providing call detail information with each voicemail message. For example, call detail information may include the calling party's telephone number (call origination number), a date/timestamp the call is received, a name of the calling party, a priority rating of the call (e.g., urgent, low priority, etc.), etc. In addition to the call detail information, the message content itself is stored in the voicemail message database of data repository 114.

Voicemail system server 102 also executes a message management application 116 for implementing the reminder services of the message management system described herein. The message management application 116 may be integrated with the voicemail system as a single application or may be separate from the voicemail system. If separate, the message management application 116 may include an application programming interface (API) to communicate with the voicemail system and provide seamless facilitation of the voicemail system and message management services described herein.

The message management application 116 utilizes a profiles database stored in a data repository 118 for facilitating the reminder services. The profiles database includes information relating to users of the message management services. Examples of information stored in the profiles database may include user names, user addresses, user telephone numbers, user account numbers, user email addresses, and device capabilities (e.g., voice device, dual-mode (voice/data) device, Internet service provider of the device, etc.). Data repositories 114 and 116 may be external storage elements with respect to the voicemail system server 102, internal storage elements, or a combination thereof. If external, data repositories 114 and 116 are physically or logically addressable to the voicemail system server 102 via direct or indirect communications means, such as network cabling, wireless communications technologies, etc.

Voicemail system server 102 may also execute a speech-to-text conversion application for converting the content of voicemail messages to text files as will be described further herein.

In exemplary embodiments, recipient communications devices 104 refer to communications devices operated by recipients of the voicemail system services and message management services described herein. Recipient communications devices may be voice-only devices (e.g., communications devices 104A-104B), dual-mode communications devices (e.g., communications devices 104C-104D), or devices not providing voice services (not shown). For example, communications device 104 represents a cellular telephone with no data capabilities that communicates over a cellular network (e.g., one of networks 108) with voicemail system server 104 in order to retrieve and manipulate voicemail messages (e.g., listen, save, delete, forward, etc.). Recipient communications device 104B refers to a wireline telephone with voice-only capabilities that communicates over a circuit-switched network (e.g., one of networks 108) with voicemail system server 102 to perform similar activities as those described above with respect to recipient communications device 104A.

Recipient communications devices 104C-104D represent dual-mode communications devices with both voice and data capabilities that are equipped to communicate over both circuit-switched and packet-switched networks (e.g., networks 110) with voicemail system server 102. As shown in the system of FIG. 1, recipient communications device 104C represents a cellular telephone and recipient communications device 104D represents a digital processing device (e.g., a personal digital assistant or similar mobile computing device).

According to an exemplary embodiment, each of recipient communications devices 104A-104B receives message management services via a voice interface provided by the message management application 116, while each of recipient communications devices 104C-104D receives message management services via either a voice interface or a web-based interface of the message management application 116.

In exemplary embodiments, recipient user system 106 refers to a processing device associated with a user of the message management services (e.g., one of the users of recipient devices 104A-104D). Thus, e.g., the user of the recipient user system 106 may be the same as the user (or at least the same as an account holder) of recipient communications device 104A. Recipient user system 106 receives reminders created via the message management services based upon options selected by a voicemail message recipient as described further herein. Alternatively, or in combination, reminders may be received at recipient communications devices 104.

Recipient user system 106 executes one or more applications, such as an email client, calendar/task application 124, web browser, etc. As shown in the system of FIG. 1, recipient user system 106 stores an email message inbox 120, a voicemail message inbox 122, and a calendar/task folder 126. Alternatively, one or more of these inboxes/folder could be stored on the network (e.g., on voicemail system server 102). In exemplary embodiments, voicemail message inbox 122 stores reminders generated via the message management services as described further herein.

Email/calendar server 112 facilitates transmissions of email reminders and/or calendar events generated by the message management application 116. For example, message management application 116 creates an email message that is forwarded to recipient user system 106 via email/calendar server 112. Alternatively, voicemail system server 102 and email/calendar server 112 may be integrated into a single processing system.

Figure 2:
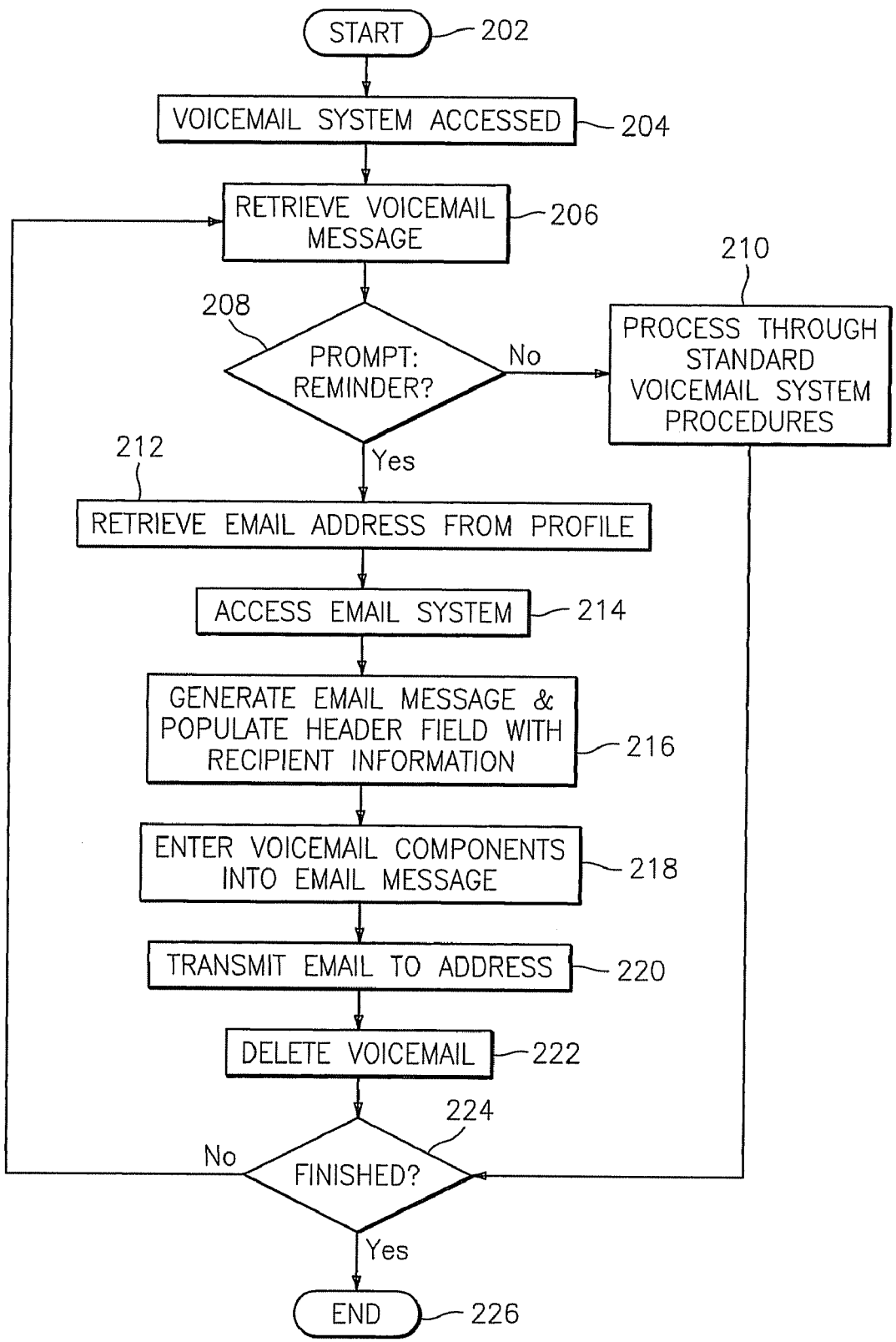
FIG. 2 is a flow diagram describing a process for implementing the message management services for voice-related devices in exemplary embodiments.

As indicated above, the message management services provide the ability to create a reminder for a recipient of a message, such as a voicemail message, to take some future action on the message. The message management services may be implemented utilizing a voice interface for voice-only devices and/or may be implemented utilizing a data interface for dual-mode or data-only devices. Turning now to FIG. 2, a flow diagram describing a process for implementing the message management services for voice-related devices will now be described in accordance with exemplary embodiments.

The process begins at step 202 whereby a user of one of recipient devices 104A-104B accesses the voicemail system of voicemail system server 102 at step 204. Following the user responses to prompts provided by the voicemail system, the voicemail system of server 102 retrieves a new voicemail message from data repository 114 and presents it to the user (i.e., the user listens to the voicemail) at step 206.

At step 208, the messaging application 116 prompts the user with options for handling the voicemail message (e.g., save, save as new, delete, forward, or reminder). These options may be implemented by audio prompts provided by voicemail system server 102 corresponding to keys on the recipient communications device (e.g., press '1' to save, press '2' to save as new, press '3' to delete, press '4' to forward, and press '5' to remind). If the user selects any option other than the reminder option, the voicemail is handled using standard voicemail system procedures (e.g., save, save as new, delete, forward) at step 210. The process then continues to step 224.

If, however, the user selects the reminder option at step 208, the message management application 116 retrieves the user's email address from the profiles database of data repository 118 at step 212. The message management application 116 accesses the email/calendar server 112 (if separate from the voicemail system server 102) at step 214 and generates an email message at step 216. The message management application 116 populates the header field (addressing field) of the email message with the recipient's email address. In addition, a voicemail identifier may be entered into the subject line of the email message to distinguish it from other voicemail messages and/or other email messages. For example, a voicemail identifier may include the time/date stamp of the voicemail message or may provide the identification of the calling party who left the voicemail message.

At step 218, voicemail components are entered into the body of the email message. The voicemail components may include any of the call detail information (e.g., calling party telephone number, date/timestamp of the voicemail message, calling party name, priority rating of the voicemail message, etc.).

At step 220, the email message is transmitted to the email address of the recipient (i.e., email address of recipient user system 106) creating a reminder to the recipient of the missed call.

At step 222, the voicemail message is deleted from the voicemail inbox of the recipient (i.e., from voicemail message database of data repository 114). This step is optional as the voicemail message may be saved if desired. However, in exemplary embodiments, the voicemail message is deleted from the voicemail inbox of the recipient in order to better manage and prevent over-clutter of the inbox.

At step 224, it is determined whether the recipient is finished (e.g., whether additional new voicemail messages exist in the voicemail inbox of the recipient). If so, the process ends at step 226. Otherwise, the process returns to step 206 whereby the next voicemail message is retrieved.

Figure 3A:
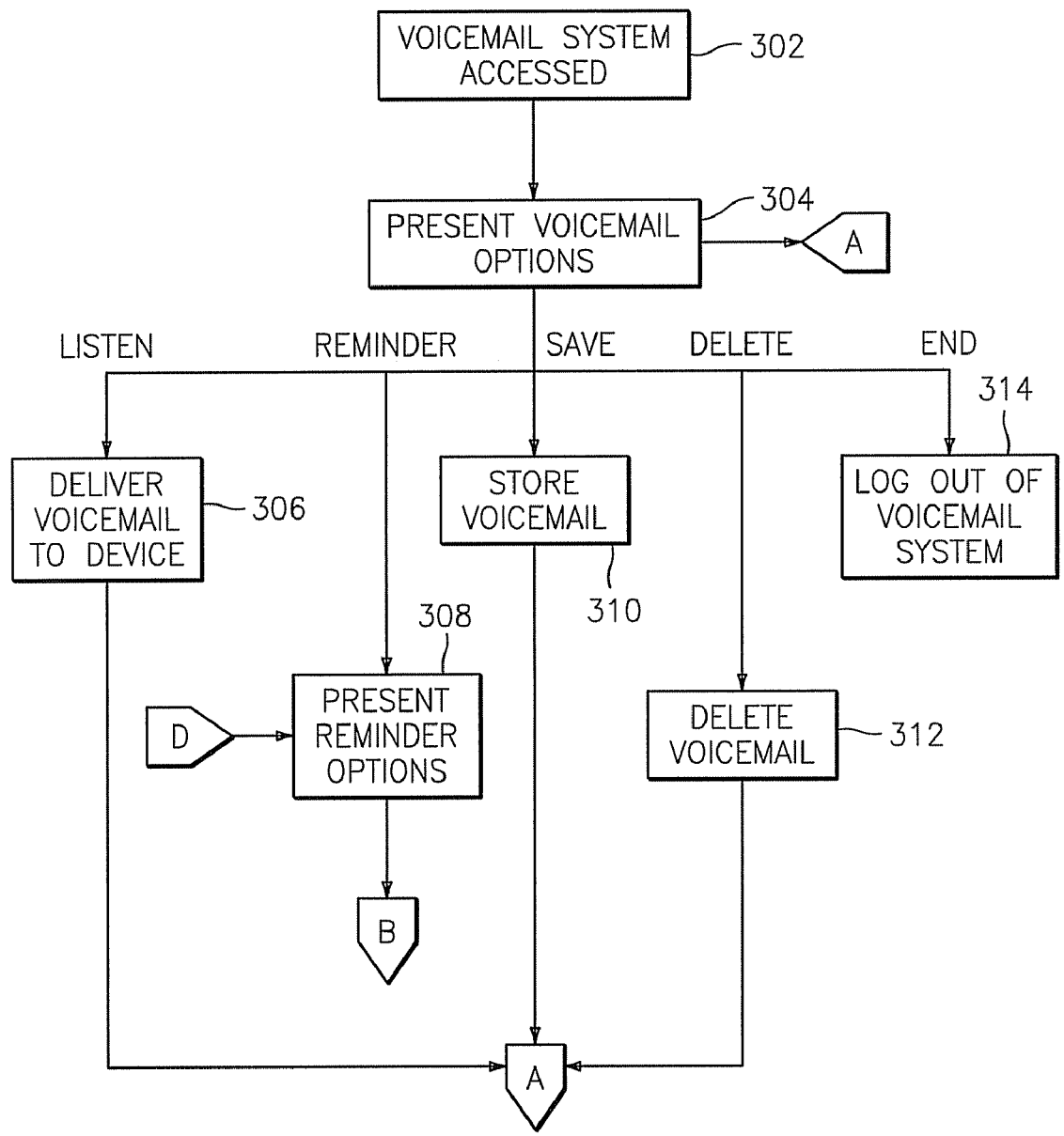
FIGS. 3A-3C show a flow diagram describing a process for implementing the message management services for dual-mode (voice/data) devices in exemplary embodiments.
Figure 3B:
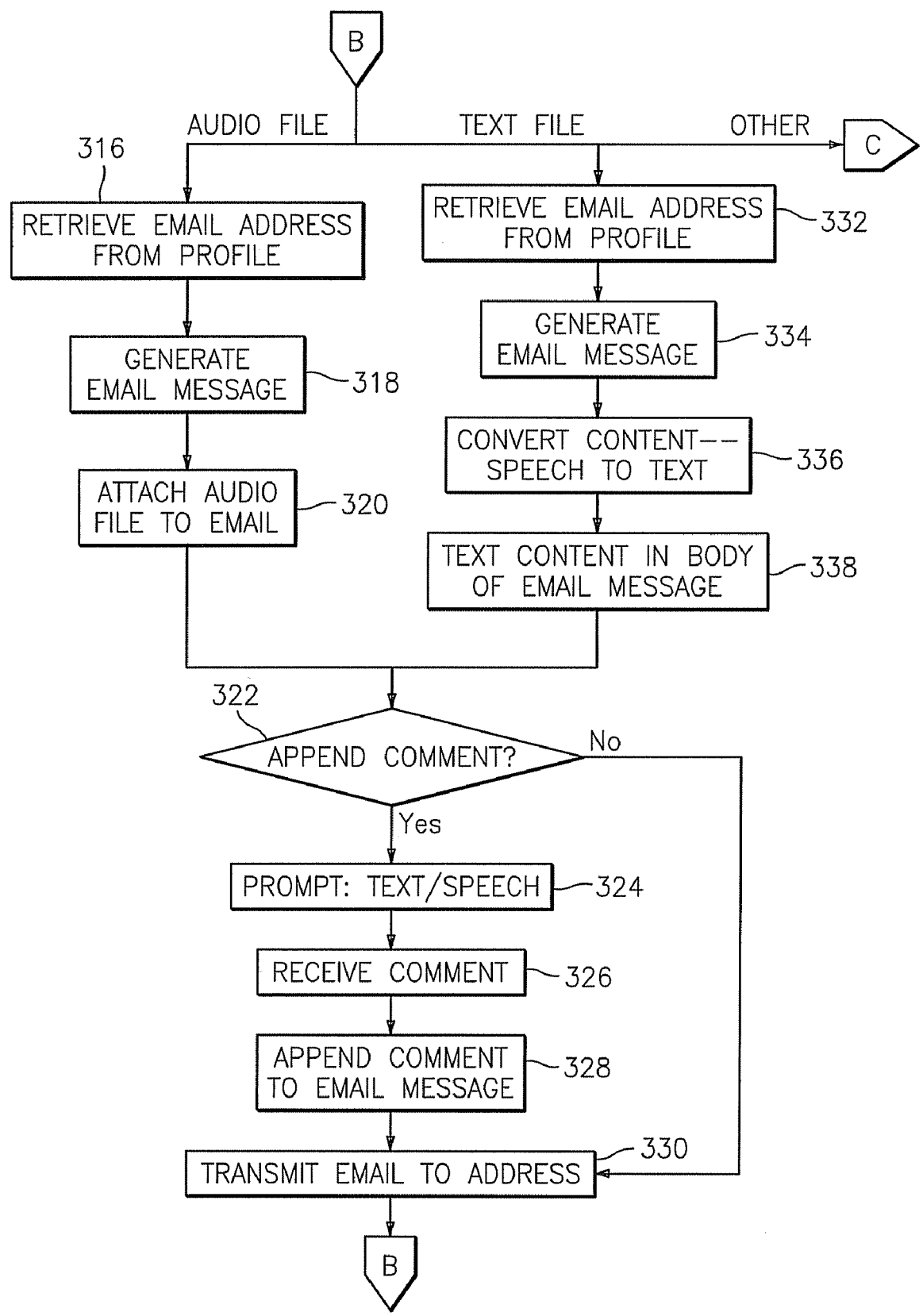
Figure 3C:
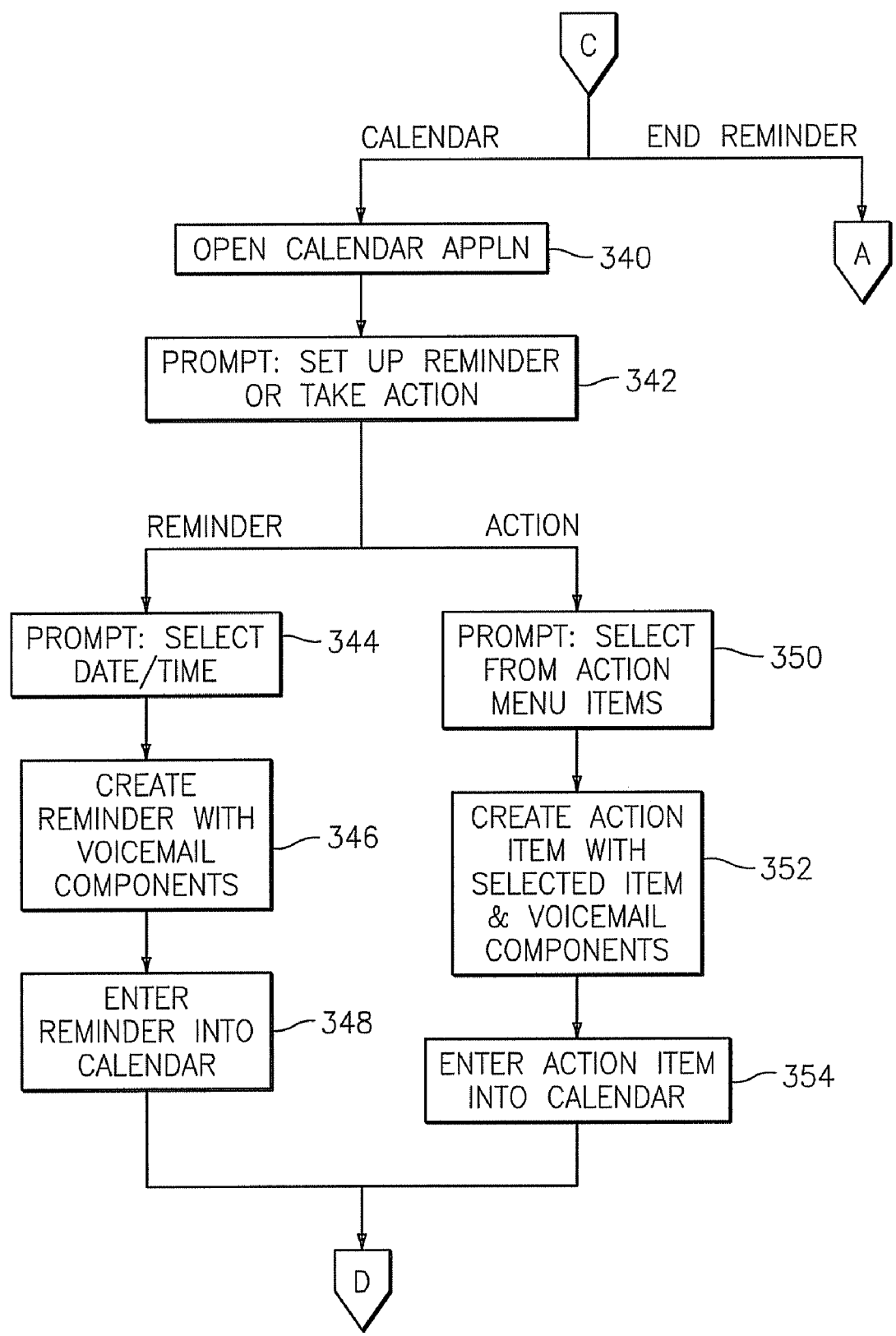
Figure 4:
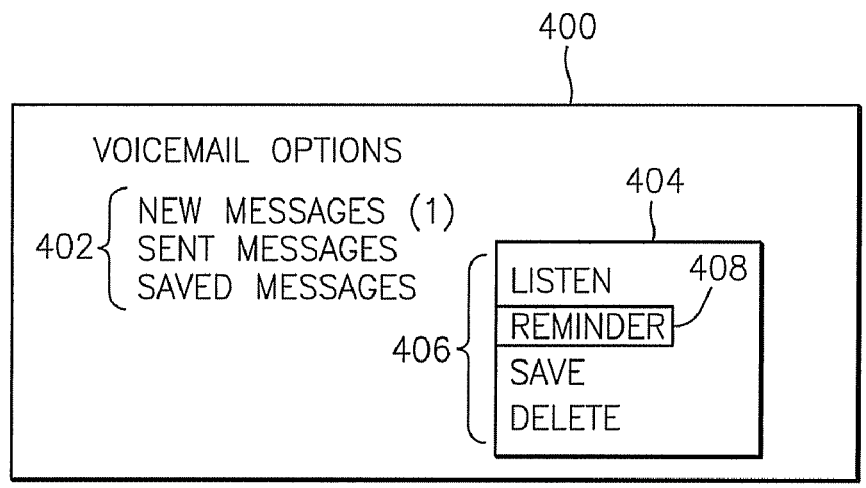
FIG. 4 shows a sample user interface illustrating the voicemail options of the message management services for dual-mode devices in exemplary embodiments.

As indicated above, the message management services may be provided for dual-mode devices. Turning now to FIGS. 3A-3C, a flow diagram describing a process for implementing the message management services for dual-mode (voice/data) devices in exemplary embodiments will now be described. The message management application 116 provides a user interface for facilitating the processes described in FIGS. 3A-3C. Sample user interface screens as seen by a user of recipient device 104C-104D are shown and described in FIGS. 4-5.

At step 302, the voicemail system of voicemail system server 102 is accessed by a user of one of recipient devices 104C-104D. The message management application 116 presents message options to the user via, e.g., the user interface screen 400 of FIG. 4. As shown in user interface screen 400, there are three message options 402 presented for accessing messages, which include NEW MESSAGES (1), SENT MESSAGES, and SAVED MESSAGES. These message options are shown for illustrative purposes. It will be understood by those skilled in the art that alternative or additional message options may be provided. The '(1)' displayed after NEW MESSAGES reflects that one new message is stored in the recipient's voicemail inbox in data repository 114. If the user selects the NEW MESSAGES message option, the message management application 116 presents a list of voicemail options 406 as shown in sub-window 404 of user interface 400 at step 304. Voicemail options include LISTEN, REMINDER 408, SAVE, and DELETE. Voicemail options further include END (not shown). The reminder services of the message management application are initiated when the user selects the REMINDER option 408.

If the user selects the LISTEN option, the voicemail system delivers the voicemail message to the user at step 306 and the process returns to step 304 whereby the voicemail options are again presented to the user. In this manner, the user may perform a second action on the voicemail in response to having listened to it (e.g., reminder, save, or delete the voicemail message).

Figure 5:
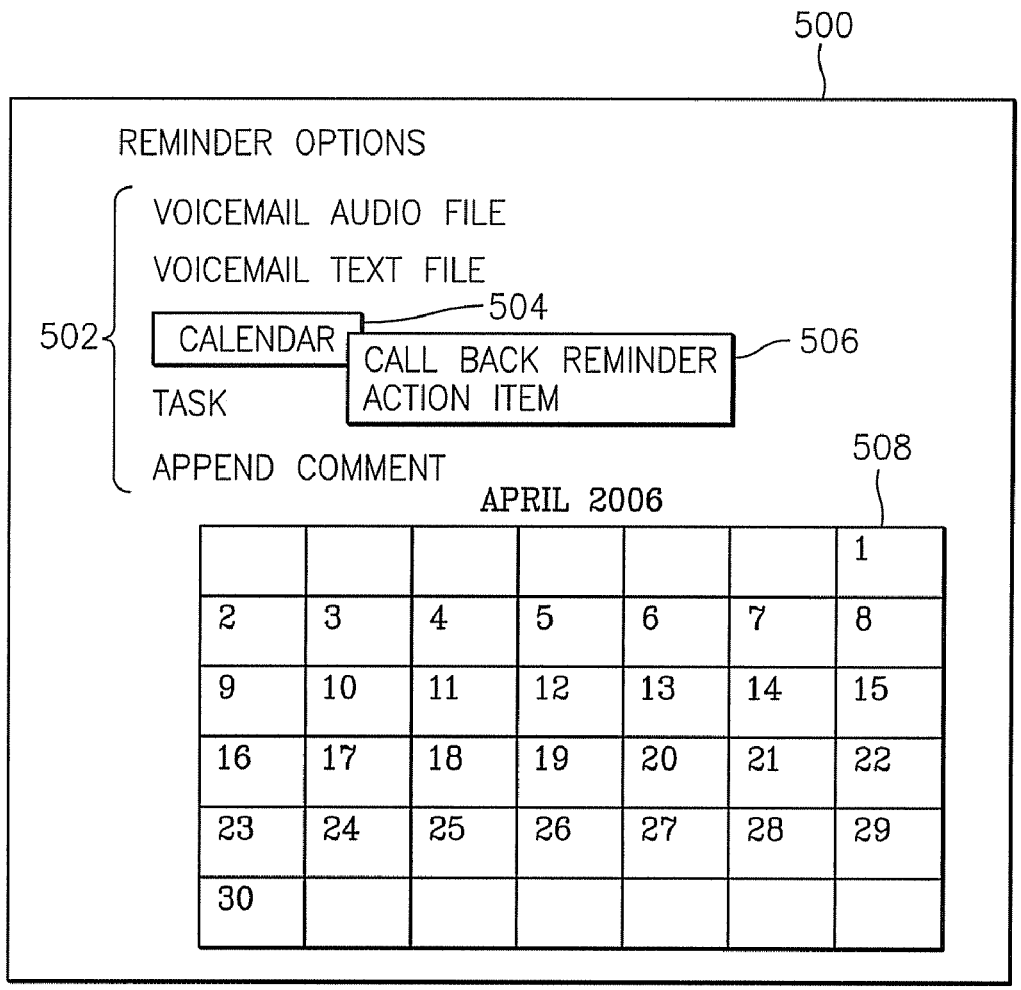
FIG. 5 shows a sample user interface illustrating the reminder options of the message management services for dual-mode devices in exemplary embodiments.

If the user selects the REMINDER option 408, reminder options are provided to the user at recipient device 104C or 104D via a user interface screen at step 308, a sample of which is shown and described in FIG. 5. These reminder options are described further in FIGS. 3B-3C.

If the user selects the SAVE option, the voicemail system stores the voicemail message in data repository 114 at step 310 and the process returns to step 304. Likewise, if the user selects the DELETE option, the voicemail system removes the voicemail message from data repository 114 at step 312 and the process returns to step 304. The user may also select END at any time whereby the voicemail system terminates the session at step 314.

Turning now to FIGS. 3B-3C, the reminder functions of the message management application 116 will now be described in exemplary embodiments. The reminder functions provide the user with an option to establish a reminder to take some future action on a voicemail message. The reminder may be implemented as an email message (FIG. 3B), a calendar entry (FIG. 3C), or a task. As indicated above, if the user selects the REMINDER option 408 via user interface 400 of FIG. 4, the message management application 116 presents the user interface screen 500 of FIG. 5 via one of recipient communications devices 104C-104D. As shown in user interface screen 500, the reminder options 502 include VOICEMAIL AUDIO FILE, VOICEMAIL TEXT FILE, CALENDAR 504, TASK, and APPEND COMMENT. As shown and described in FIGS. 3A-3C, it will be appreciated that the activities provided via the reminder option 408 may occur before, during, after, or in lieu of listening to the voicemail message.

In exemplary embodiments, an email reminder is generated via the message management application 116 as described in FIG. 3B. The email reminder may be a simple email message that includes call detail information of the voicemail message or may be a detailed email message that includes an attached audio file and/or a text file of the voicemail message content.

If the user selects the VOICEMAIL AUDIO FILE option 502 from user interface screen 500 of FIG. 5, the messaging application 116 accesses the profiles database of data repository 118 of FIG. 1 and retrieves the email address of the user at step 316. At step 318, the message management application 116 generates an email message and provides the email address in the header section of the email message. The message management application 116 may also provide a voicemail identifier in the subject line of the email address to distinguish the email message from others. The voicemail identifier may include call detail information, such as the telephone number of the calling party, the name of the calling party, the date/timestamp of the voicemail, a priority rating assigned to the voicemail, etc.

At step 320, the message management application attaches an audio file of the voicemail (i.e., the voicemail message content) to the email. For example, the audio file might be a .WAV file. The format of the audio file may be determined using, e.g., the device capabilities of recipient device 104C or 104D that are stored in the profiles database of data repository 118.

If desired, the user may append a comment to the email message via APPEND COMMENT option 502 in user interface screen 500 of FIG. 5. The comment may be remarks offered by the recipient as a supplementary reminder to the email message. For example, suppose the voicemail message is from an employer of the recipient and the voicemail message content includes notification of an upcoming meeting on Wednesday. The supplemental remarks added by the recipient to the email message might be "pick up suit from dry cleaners on Tuesday" or "reschedule Wednesday's dentist appointment". The comment may be implemented via a voice recording provided by the recipient into the recipient communications device 104C-104D or may be a text file implemented by entering data into the recipient device 104C-104D via, e.g., keypad.

Returning now to FIG. 3B, it is determined whether the user would like to append a comment to the email message at step 322. If so, the user is prompted to select either a voice comment or a text comment at step 324. Alternatively, depending upon the device capabilities provided in the profiles database of data repository 118, the prompt may include only the options specified in the profiles database that correspond to the capabilities of the device.

The user enters the comment (either text or voice) which is transmitted over network(s) 110 and received by the message management application 116 via voicemail system server 102 at step 326. At step 328, the message management application 116 appends the comment as one of a text file or audio file to the email message at step 328 and transmits the email to the recipient user system 106 at step 330. Alternatively, if the user desires not to append a comment, the email message with attached audio file from step 320 is transmitted to the recipient user system 106 at step 330.

As indicated above, the user may select a reminder that includes an email with text file via VOICEMAIL TEXT FILE option 502 of user interface screen 500 of FIG. 5 and as described in steps 332-330 of FIG. 3B. If the user selects the VOICEMAIL TEXT FILE option 502, the message management application 116 accesses profiles database of data repository 118 and retrieves the recipient's email address at step 332. The message management application 116 generates an email message and enters the email address into the header section of the email message at step 334. The audio or digital recording of the voicemail message content is converted to text via the speech-to-text conversion application implemented by voicemail system server 102 at step 336. A text file is created from the results of the conversion and is entered into the body of the email message or attached to the email message as an attachment at step 338. The user may then be prompted to append a comment and the process continues with steps 322-330 as described above with respect to the VOICEMAIL AUDIO FILE features. Once the email message has been transmitted at step 330, the process returns to step 308 whereby the reminder options 502 of user interface screen 500 of FIG. 5 are again presented.

As described above, the user may be provided with options that provide a reminder via a calendar entry or task folder entry (e.g., 'to-do' list). These features are described in FIG. 3C. If the user selects the CALENDAR option 504 of user interface screen 500 of FIG. 5, a sub-window 506 is presented that includes further options. These options include CALL BACK REMINDER and ACTION ITEM. A call back reminder may be a simple calendar entry in the recipient's calendar application specifying a date (and optionally, a time) in which the recipient will return the call associated with the voicemail message. The entry may also include the calling party's telephone number. An action item may include a note in the recipient's calendar application to take some action other than calling back the party identified in the voicemail message. For example, the action item may specify the date, time, location, and descriptor of the action (e.g., a meeting). Thus, the calendar entry may be a scheduled event that includes information elements relating to the event.

If the user selects the CALENDAR option 504 of user interface screen 500 of FIG. 5, the message management application 116 opens a calendar application on the recipient communications device 104C or 104D at step 340 and presents a sub-window 508 that includes a calendar. The user is prompted to create a call back reminder or action item via sub-window 506 of user interface screen 500 at step 342. If the user selects the CALL BACK REMINDER option, the message management application 116 prompts the user to select a date (and optionally, a time) to call back the person identified in the voicemail message at step 344. This information may be entered via, e.g., the keypad on the recipient communications device 104C or 104D.

At step 346, the message management application 116 creates the reminder using the voicemail components of the voicemail message. For example, the caller identity and/or the calling telephone number may be integrated into the reminder, such as "Call 'John' at '555-123-4567'. The reminder may be entered into a date on the calendar that is selected by the user in step 344 at step 348. Once the call back reminder is completed, the process returns to step 308 of FIG. 3B whereby the reminder options 502 of user interface screen 500 are again presented to the user.

If, on the other hand, the user selects the ACTION ITEM option from sub-window 506 of user interface screen 500 of FIG. 5, the message management application 116 presents further action menu items to the user (e.g., meeting, doctor appointment, seminar, etc.) at step 350. These action menu items provide the descriptor for the action event. Alternatively, or in combination, the user may enter a custom event using the input elements of the recipient communications device 104C or 104D.

At step 352, the message management application 116 creates an action item using the selected descriptor and voicemail components (e.g., call detail components) and enters the action item into the calendar at step 354. The process then returns to step 308 of FIG. 3B.

The calendar entries described in FIG. 3C may also be implemented on the recipient user system 106 via, e.g., email/calendar server 112 and network(s) 110.

The user is provided with an option to close the reminder features via the reminder options 502 (not shown) whereby the process returns to step 304 of FIG. 3A.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, comprising:
presenting a listing of voicemail messages from a voicemail inbox via a voicemail system, the voicemail messages comprising communication detail components and content;
receiving a request from a recipient to create a reminder to take action on a voicemail message in the listing before the recipient opens the voicemail message, the request received in response to the recipient selecting a reminder option for handling the voicemail message;
creating a reminder that includes the communication detail components, the creating a reminder including generating an email message and appending a voice recording of the recipient to the email message; and
sending the reminder to a location, the reminder including information related to an action to be taken specified by the recipient of the voicemail message.

2. The method of claim 1, further comprising:
deleting the voicemail message.

3. The method of claim 1, wherein the location is an email inbox, the method further comprising retrieving an email address of the recipient from a database;
wherein the creating a reminder further includes:
entering the email address into an address field of the email message;
entering the communication detail components into the email message; and
transmitting the email message to the email inbox.

4. The method of claim 3, further comprising attaching an audio file that includes the voicemail message to the email message prior to the transmitting.

5. The method of claim 1, further comprising:
providing voice mailbox system options to the recipient, the voice mailbox system options including the reminder option presented in response to access of the voice mailbox system by the recipient.

6. The method of claim 3, further comprising converting the voicemail message to a text file and attaching the text file to the email message prior to the transmitting.

7. The method of claim 1, wherein the location is an electronic calendar, the method further comprising opening a calendar application associated with the recipient;
wherein the creating a reminder further includes creating a calendar entry that includes the communication detail components, the calendar entry specifying a date selected by the recipient, the date selected by the recipient corresponding to a time for the action to be taken.

8. The method of claim 1, wherein the communication detail components include a phone number of a sender of the voicemail message, a date and time stamp of the voicemail message, a name of the sender, and a priority rating of the voicemail message.

9. A system, comprising:
a computer processing device; and
a message management application executing on the computer processing device, the message management application performing a method, comprising:
presenting a listing of voicemail messages, the voicemail messages comprising communication detail components and content;
receiving a request from a recipient to create a reminder to take action on a voicemail message in the listing before the recipient opens the voicemail message, the request received in response to the recipient selecting a reminder option for handling the voicemail message;
creating a reminder that includes the communication detail components, the creating a reminder including generating an email message and appending a voice recording of the recipient to the email message; and
sending the reminder to a location, the reminder including information related to an action to be taken specified by the recipient of the voicemail message.

10. The system of claim 9, wherein the message management application further performs:
deleting the voicemail message.

11. The system of claim 9, wherein the location is an email inbox, the method further comprising retrieving an email address of the recipient from a profiles database that is in communication with the computer processing device;
wherein the creating a reminder further includes:
entering the email address into an address field of the email message;
entering the communication detail components into the email message; and
transmitting the email message to the email inbox.

12. The system of claim 11, wherein the method management application further performs attaching an audio file that includes the voicemail message to the email message prior to the transmitting.

13. The system of claim 9, the message management application further performing:
providing voice mailbox system options to the recipient, the voice mailbox system options including the reminder option presented in response to access of the voice mailbox system by the recipient.

14. The system of claim 11, wherein the message management application further performs converting the voicemail message to a text file via a speech-to-text conversion application and attaching the text file to the email message prior to the transmitting.

15. The system of claim 9, wherein the location is an electronic calendar, the method further comprising opening a calendar application associated with the recipient;
wherein the creating a reminder further includes creating a calendar entry that includes the communication detail components, the calendar entry specifying a date selected by the recipient, the date selected by the recipient corresponding to a time for the action to be taken.

16. The system of claim 9, wherein the communication detail components include a phone number of a sender of the voicemail message, a date and time stamp of the voicemail message, a name of the sender, and a priority rating of the voicemail message.

17. A computer program product comprising a non-transitory storage medium including instructions embodied thereon, which when executed by a computer cause the computer to implement a method, the method comprising:
presenting a listing of voicemail messages, the voicemail messages comprising communication detail components and content;

receiving a request from a recipient to create a reminder to take action on a voicemail message in the listing before the recipient opens the voicemail message, the request received in response to the recipient selecting a reminder option for handling the voicemail message;

creating a reminder that includes the communication detail components, the creating a reminder including m message and appending a voice recording of the recipient to the email message; and sending the reminder to a location, the reminder including information related to an action to be taken specified by the recipient of the voicemail message.

18. The computer program product of claim 17, further comprising instructions for implementing:

deleting the voicemail message.

19. The computer program product of claim 17, wherein the location is an email inbox, the method further comprising retrieving an email address of the recipient from a database;

wherein the creating a reminder further includes:

entering the email address into an address field of the email message;

entering the communication detail components into the email message; and transmitting the email message to the email inbox.

20. The computer program product of claim 19, further comprising instructions for attaching an audio file that includes the voicemail message to the email message prior to the transmitting.

21. The computer program product of claim 17, wherein the method further comprises:

providing voice mailbox system options to the recipient, the voice mailbox system options including the reminder option presented in response to access of the voice mailbox system by the recipient.

22. The computer program product of claim 19, further comprising instructions converting the voicemail message to a text file and attaching the text file to the email message prior to the transmitting.

23. The computer program product of claim 17, wherein the location is an electronic calendar, the method further comprising opening a calendar application associated with the recipient;

wherein the creating a reminder further includes creating a calendar entry that includes the communication detail components, the calendar entry specifying a date selected by the recipient, the date selected by the recipient corresponding to a time for the action to be taken.

24. The computer program product of claim 17, wherein the communication detail components include a phone number of a sender of the voicemail message, a date and time stamp of the voicemail message, a name of the sender, and a priority rating of the voicemail message.

\* \* \* \* \*